United States Patent [19]

Kohara et al.

[11] Patent Number: 5,302,656
[45] Date of Patent: Apr. 12, 1994

[54] MOLDED ARTICLE OF NORBORNENE-BASED POLYMER

[75] Inventors: Teiji Kohara, Kawasaki; Tadao Natsuume, Yokosuka, both of Japan

[73] Assignee: Nippon Zeon Co., Ltd., Tokyo, Japan

[21] Appl. No.: 683,161

[22] Filed: Apr. 10, 1991

[30] Foreign Application Priority Data

Apr. 13, 1990 [JP] Japan ................... 2-096568
Mar. 13, 1991 [JP] Japan ................... 3-073998

[51] Int. Cl.$^5$ .............................................. C08L 45/00
[52] U.S. Cl. ................................. 524/579; 524/504
[58] Field of Search .......................... 524/579, 504

[56] References Cited

U.S. PATENT DOCUMENTS 4,994,508  2/1991  Shiraki et al. ..................... 524/504
5,115,041  5/1992  Tenney et al. ................... 525/332.1

FOREIGN PATENT DOCUMENTS 0317262  5/1989  European Pat. Off. .
2540553  3/1977  Fed. Rep. of Germany .

OTHER PUBLICATIONS

Database WPI Derwent Publicationss Ltd.-J-P-51092860.
Database WPI Derwent Publications Ltd.-J-P-52039752.

Primary Examiner—Paul R. Michl
Assistant Examiner—Edward Cain
Attorney, Agent, or Firm—Armstrong, Westerman, Hattori, McLeland & Naughton

[57] ABSTRACT

A molded article, particularly for optical use, formed of a thermoplastic saturated norbornene-based polymer composition including a thermoplastic saturated norbornene-based polymer excellent in heat resistance, etc., and a filler, the composition being capable of preventing cracks even when an insertion part having a linear expansion coefficient greatly different from that of the polymer is present and a thermal change occurs. The filler is selected from a fibrous filler and a combination of a fibrous filler with a powdery filler.

16 Claims, No Drawings

MOLDED ARTICLE OF NORBORNENE-BASED POLYMER

BACKGROUND OF THE INVENTION

1. Field of the Invention

The present invention relates to a molded article having excellent crack resistance, more specifically to a molded article having excellent crack resistance which is integrally formed by molding a thermoplastic saturated norbornene-based polymer over an insertion part having a linear expansion coefficient of not more than $2.5 \times 10^{-5}/°C$.

2. Related Art

It is known that a thermoplastic saturated norbornene-based polymer is widely usable due to its excellent transparency, heat resistance, humidity resistance, chemical resistance, etc., and also useful particularly as an optical plastic molding material for an optical disk substrate, etc., due to smallness of its birefringence.

However, a problem is that a molded article integrally formed by molding a thermoplastic saturated norbornene-based polymer over an insertion part having a smaller linear expansion coefficient is liable to crack due to thermal changes, etc., since the linear expansion coefficient of the polymer and that of the insertion part are different to a large extent.

In an optical magnetic disk, it is general practice, in order to fix said disk to a drive apparatus with a magnet, to employ a method in which a hub integrally formed by molding a resin with a metal plate insert is bonded to an optical disk substrate. As a method for bonding a hub to an optical disk substrate, there are known an ultrasonic bonding method and a method using an ultraviolet-curable adhesive, a thermosetting adhesive, a hot-melt adhesive, or the like. Of these methods, an ultrasonic bonding method is generally used since the bonding time is short and its workability is excellent. In the case of an ultrasonic bonding, however, it is difficult to bond polymers which greatly differ in chemical composition. Therefore, a hub formed of the same polymer as that of an optical disk substrate is used. For example, a combination of a substrate formed of polycarbonate with a hub formed of polycarbonate or a combination of an optical disk substrate formed of a thermoplastic saturated norbornene-based polymer with a hub formed of a thermoplastic saturated norbornene-based polymer is suitable for ultrasonic bonding. However, a hub integrally formed by molding a thermoplastic saturated norbornene-based polymer with a preferred metal such as stainless steel, etc., insert has problems in that it is liable to crack as described above and is unreliable when used under an environment having a high temperature and a high humidity. For this reason, there is employed a method in which a hub formed of polycarbonate or poly-4-methyl-1-pentene is bonded to an optical disk substrate formed of a thermoplastic saturated norbornene-based polymer with an adhesive. However, bonding workability is not necessarily good, nor is durability of the bonding strength sufficient.

SUMMARY OF THE INVENTION

It is an object of the present invention to provide a molded article which is integrally formed by molding a thermoplastic saturated norbornene-based polymer in the presence of an insertion part having a linear expansion coefficient of not more than $2.5 \times 10^{-5}/°C$, and which scarcely cracks.

The present inventors made a diligent study to overcome the prior art problems, and found that a resin composition formed by incorporating a filler, particularly, a fibrous filler or a filler formed of a combination of a fibrous filler with a powdery filler into a thermoplastic saturated norbornene-based polymer is excellent in crack resistance of a molded article integrally formed over an insertion part having a small linear expansion coefficient. The present invention has been completed on the basis of this finding.

DETAILED DESCRIPTION OF THE INVENTION

According to the present invention, there is therefore provided a molded article integrally formed by molding a thermoplastic saturated norbornene-based polymer composition comprising (a) 100 parts by weight of a thermoplastic satuarted norbornene-based polymer and (b) 10 to 100 parts by weight of a filler over an insertion part having a linear expansion coefficient of not more than $2.5 \times 10^{-5}/°C$.

Thermoplastic saturated norbornene-based polymer

The thermoplastic saturated norbornene-based polymer used in the present invention is the polymer derived from the norbornene-based monomer, which is the monomer having norbornene-ring, and saturated by hydrogenating olefinic double bonds in the polymer molecule. Examples of the thermoplastic saturated norbornene-based polymer are hydrogenating a ring-opening polymerization polymer of at least one member of monomers of the formula I,

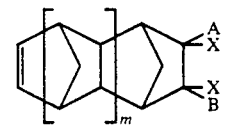

wherein each of A and B is hydrogen or a hydrocarbon having 1 to 10 carbon atoms, each of X and Y is hydrogen, a hydrocarbon having 1 to 10 carbon atoms, halogen, a halogen-substituted hydrocarbon having 1 to 10 carbon atoms, $-(CH_2)_nCOOR^1$, $-(CH_2)_nOCOR^1$, $-(CH_2)_nCN$, $-(CH_2)_nCONR^1R^2$, $-(CH_2)_nCOOZ$, $-(CH_2)_nOCOZ$, $-(CH_2)_nOZ$, or $-(CH_2)_nW$ or X and Y constitute $-CO-O-CO-$ or $-CO-NR^3-CO$, or alternatively, a combination of A with X or a combination of B with Y constitutes alkylidene, and m is 0 or 1, in which each of $R^1$, $R^2$ and $R^3$ is a hydrocarbon having 1 to 20 carbon atoms, Z is a hydrocarbon having 1 to 20 carbon atoms or a halogen-substituted hydrocarbon having 1 to 20 carbon atoms, W is $-Si(R^4)_3$ in which each of $R^4$'s is independently a hydrocarbon having 1 to 10 carbon atoms, and n is an integer of 0 to 10; an addition-type polymer of at least one member of the monomers of the formula I and a hydrogenation product thereof; and a copolymer of at least one member of the monomers of the formula I with ethylene and/or an α-olefin and a hydrogenation product thereof.

Examples of the norbornene-based monomers are norbornene, 5-methyl-2-norbornene, 5-ethyl-2-norbornene, 5-n-propyl-2-norbornene, 5-iso-propyl-2-norbornene, 5-ethylidene-2-norbornene, 5-n-propylidene-2- norbornene, 5-phenyl-2-norbornene, 5-(4'-chlorophenyl)-2-norbornene, 5-cyclohexyl-2-norbornene, 5-(3'-cyclohexenyl)-2-norbornene, 5-pyridyl-2-norbornene, 5-chloro-2-norbornene, 5-cyano-2-norbornene, 5-methoxycarbonyl-2-norbornene, 2-acetoxy-2-norbornene, 5,6-dimethyl-2-norbornene, 5,6-dimethoxycarbonyl-2-norbornene, 5-methyl-5-methoxycarbonyl-2-norbornene, 5-methyl-5-cyano-2-norbornene, dicyclopentadiene, 2,3-dihydrodicyclopentadiene, 1,4-methano-1,4,4a,5,6,7,8,8a-octahydronaphthalene, 1,4:5,8-dimethano-1,4,4a,5,6,7,8,8a-octahydronaphthalene, 6-methyl-1,4:5,8-dimethano-1,4,4a,5,6,7,8,8a-octahydronaphthalene, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-methoxycarbonyl-1,4:5,8-dimethano-1,4,4a,5,6,7,8,8a-octahydronaphthalene, 6,7-dimethyl-1,4:5,8-dimethano-1,4,4a,5,6,7,8,8a-octahydronaphthalene, 6-methyl-6-methoxycarbonyl-1,4:5,8-dimethano-1,4,4a,5,6,7,8,8a-octahydronaphthalene, 6-methyl-6-cyano-1,4:5,8-dimethano-1,4,4a,5,6,7,8,8a-octahydronaphthalene, 4,9:5,8-dimethano-3a,4,4a,5,8,8a,9,9a-octahydro-1H-benzoindene, 4,9:5,8-dimethano-2,3,3a,4,4a,5,8,8a,9,9a-decahydro-1H-benzoindene, 5,8-methano-3a,4,4a,5,8,8a,9,9a-octahydro-1H-benzoindene, 1,4:5,8-dimethano-1,4,4a,4b,5,6,7,8,8a,9a-decahydro-9H-fluorene, 1,4-methano-1,4,4a,4b,5,8,8a,9a-octahydro-9H-fluorene, 4,11,5,10:6,9-trimethano-3a,4,4a,5,5a,6,9,9a,10,10a,11,11a-dodecahydro-1H-cyclopentaanthracene, etc.

Examples of the α-olefin are propylene, 1-butene, 1-pentene, 1-hexene, 1-octene, 1-decene, 3-methyl-1-butene, 3-methyl-1-pentene, 4-methyl-1-pentene, vinylcyclohexane, vinylcyclohexene, etc.

The ring-opening polymerization polymer of at least one member of the monomers of the formula I is obtained by a known ring-opening polymerization method, and the hydrogenation product thereof is also prepared by a known hydrogenation method. The adduct-type polymer of at least one member of the monomers of the formula I and the copolymer of at least one member of the monomers of the formula I with ethylene and/or the α-olefin are obtained by a known polymerization method, and the hydrogenation products thereof are also obtained by a known hydrogenation method.

The thermoplastic saturated norbornene-based polymer has an intrinsic viscosity, measured in decalin or chlorobenzene at 80° C., of 0.3 to 3.0 dl/g, preferably 0.6 to 1.0 dl/g, which is a guideline for its molecular weight. When unsaturated bonds residual in its molecular chain are saturated by hydrogenation, the hydrogenation ratio is not less than 90%, preferably not less than 95%, particularly preferably not less than 99%. When it is a saturated polymer, the thermal deterioration resistance, moldability, etc., are improved.

The thermoplastic saturated norbornene-based polymer may be a polymer obtained by copolymerizing other monomer components such as cycloolefin, diolefin, etc., during the preparation of the thermoplastic saturated norbornene-based polymer as far as these other monomer components do not impair the object of the present invention.

Filler

The filler used in the present invention is selected, for example, from fibrous fillers such as glass fibers, carbon fibers, boron fibers, silicon carbide fibers, asbestos fibers, fine fibers of potassium titanate crystals, quartz fibers, metal fibers, polyamide fibers, polyester fibers, etc.; and powdery fillers such as silica, diatomaceous earth, alumina, titanium oxide, magnesium oxide, powdered pumice, pumice balloon, aluminum hydroxide, magnesium hydroxide, basic magnesium carbonate, calcium carbonate, dolomite, calcium sulfate, barium sulfate, calcium sulfite, talc, clay, mica, glass flakes, glass beads, calcium silicate, montmorillonite, bentonite, graphite, powdered aluminum, molybdenum sulfide, antimony oxide, etc. These fillers may be those of which the surfaces are not treated. However, when a filler of which the surface is treated with a silane compound, etc., is used, the resultant composition is desirably improved in moldability, mechanical strength, etc. Of these fillers, a fibrous filler or a combination of a fibrous filler with a powdery filler is preferred to improve the crack resistance, and a combination of a fibrous filler with a powdery filler is further preferred since the use of such improves the moldability of the resultant composition further.

The average diameter of the fibrous filler used in the present invention is generally 0.1 to 100 μm, preferably 0.2 to 50 μm, and the length thereof is generally 5 μm to 20 mm, preferably 10 μm to 10 mm when the resultant composition is subjected to molding methods such as injection molding, extrusion molding, etc., or generally not less than 5 μm, preferably not less than 10 μm when the resultant composition is subjected to a molding method such as compression molding, etc. The average particle diameter of the powdery filler is 0.01 μm to 1 mm, preferably 0.1 to 100 μm.

Thermoplastic saturated norbornene-based polymer composition

The thermoplastic saturated norbornene-based polymer composition comprises the thermoplastic saturated norbornene-based polymer and the filler.

The amount of the filler per 100 parts by weight of the thermoplastic saturated norbornene-based polymer is 1 to 100 parts by weight, preferably 5 to 80 parts by weight. When the amount of the filler is too small, the linear expansion coefficient of the composition is not sufficiently decreased, and no effect on improvement in crack resistance is produced in a molded article formed in the presence of an insertion having a linear expansion coefficient of not more than $2.5 \times 10^{-5}$/°C. When the above amount is too large, the moldability of the resultant composition is undesirably impaired.

When a combination of the fibrous filler and the powdery filler is used, the mixing ratio is 1:99 to 99:1, preferably 20:80 to 90:10, more preferably 40:60 to 80:20. When the amount of the powdery filler is too small, no effect on moldability is produced. When it is too large, the moldability and mechanical strength are undesirably impaired.

A thermoplastic saturated norbornene-based polymer has a linear expansion coefficient of not less than $6.0 \times 10^{-5}$/°C., generally $7.0 \times 10^{-5}$/°C., whereas a molded article formed of the thermoplastic saturated norbornene-based polymer composition used in the present invention has a linear expansion coefficient of not more than $5.0 \times 10^{-5}$/°C., preferably not more than $4.0 \times 10^{-5}$/°C.

Further, the thermoplastic saturated norbornene-based polymer composition of the present invention is excellent in dimensional stability, a low degree of shrinkage, etc., and suitable for molding where a high precision level is required, since the filler is incorporated into the thermoplastic saturated norbornene-based polymer. For example, thermoplastic saturated norbornene-based polymer generally has a mold shrinkage factor of not less than 0.7%, whereas the thermoplastic saturated norbornene-based polymer used in the present invention has a mold shrinkage factor of 0.4% or less.

Other components

The thermoplastic saturated norbornene-based polymer composition used in the present invention contains, as essential components, the thermoplastic saturated norbornene-based polymer and the filler. As far as the effect of the present invention is not impaired, the following components may be incorporated; polymers such as polyolefin, poly(meth)acrylic acid ester, poly(meth)acrylic acid, poly(meth)acrylonitrile, polyvinyl chloride, polyvinylidene chloride, a fluorine-containing polymer, ABS, polystyrene, polynorbornene, a copolymer, block polymer or graft polymer of these, a styrene-maleic anhydride copolymer, polyimide, polycarbonate, polyester, polyamide, polyurethane, polyether, polysulfide, polysulfone, rubber, a petroleum resin, a hydrogenated petroleum resin, unsaturated polyester, an epoxy resin, a silicone resin, modified polyester, etc.; an antioxidant, a pigment, a dye, a plasticizer, a mold releasing agent, a flame retardant, a light stabilizer, an ultraviolet light absorber, an antistatic agent, a lubricant, a surfactant, an electromagnetic wave shielding agent, a magnetic powder, a natural fiber, etc. These components may be incorporated in any amount as required. In general, however, the amount of these components per 100 parts by weight of the thermoplastic saturated norbornene-based polymer is not more than 50 parts by weight, preferably not more than 25 parts by weight.

Insertion part

The insertion part used in the present invention has a linear expansion coefficient of not more than $2.5 \times 10^{-5}$/°C., preferably $1 \times 10^{-6}$ to $2 \times 10^{-5}$/°C. When an insertion part having a large linear expansion coefficient such as lead is used, a molded article scarcely cracks whether the filler is incorporated or not, since the linear expansion coefficient does not differ much between the thermoplastic saturated norbornene-based polymer and the insertion part. When an insertion part having a small linear expansion coefficient is used, the filler is incorporated into the thermoplastic saturated norbornene-based polymer in order to decrease its linear expansion coefficient. Otherwise, the resultant molded article is liable to crack due to a large difference in the linear expansion coefficient between the insertion part and the composition.

Examples of the substance having a linear expansion coefficient of not more than $2.5 \times 10^{-5}$/°C. are general metals such as iron, copper, aluminum, stainless steel, etc., glass such as boro-silicate glass, lead glass, optical glass, etc., and ceramics. In addition, stainless steel has a linear expansion coefficient of $1 \times 10^{-5}$ to $2 \times 10^{-5}$/°C., and a typical stainless steel of SUS304 has a linear expansion coefficient of $1.64 \times 10^{-5}$/°C.

Molding method

A molded article of the present invention is formed by preliminarily setting an insertion part in a necessary position within a mold, and injection molding or compression-molding the thermoplastic saturated norbornene-based polymer used in the present invention. A hub for an optical disk is generally produced by injection molding.

In addition, the thermoplastic saturated norbornene-based polymer composition of the present invention enables more precise molding than a thermoplastic saturated norbornene-based polymer as described above.

Molded article

A molded article integrally formed from the thermoplastic saturated norbornene-based polymer used in the present invention and an insertion part is excellent in mechanical strength and heat resistance since the difference in linear expansion coefficient between the composition and the insertion is small.

Further, a molded article of the present invention is excellent in water resistance, electrical insulating properties, chemical resistance, etc., due to an effect produced by the use of the thermoplastic saturated norbornene-based polymer, and also excellent in dimensional stability due to an effect produced by the incorporation of the filler.

Specific examples of the molded article which exhibits the effect of the present invention are metal plate-inserted precision machine parts and hubs for optical disk, glass-inserted connectors for glass fibers, IC element or LED element-inserted articles, etc.

Further, the thermoplastic saturated norbornene-based polymer composition used in the present invention is well bonded to a molded article formed of a thermoplastic saturated norbornene-based polymer by an ultrasonic bonding method, and a preferred embodiment of the present invention is that of a hub for an optical disk which has an insertion of a stainless steel plate, a nickel plate, or the like.

EXAMPLES

The present invention will be explained further in detail by reference to Examples, to which the present invention however shall not be limited. In Examples, "part" stands for "part by weight".

EXAMPLE 1

(1) Preparation of pellets

30 Parts of a glass fiber (average diameter 13 μm, average length 6 mm) of which the surface had been treated with γ-aminopropyltrimethoxysilane and 0.05 part of tetrakis[3-(3,5-di-tert-butyl-4-hydroxyphenyl)-propionyloxymethyl]methane were added to 100 parts of a hydrogenation product of a ring-opening polymerization polymer of 6-methyl-1,4:5,8-dimethano-1,4,4a,5,6,7,8,8a-octahydronaphthalene (hydrogenation product having an intrinsic viscosity, measured in decalin at 80° C., of 1.13 dl/g and a hydrogenation ratio of nearly 100%), and the resultant composition was kneaded with a twin-screw extruder under nitrogen atmosphere at 250° C. to obtain pellets.

The above composition has a mold shrinkage factor of 0.3% and a linear expansion coefficient of $3.0 \times 10^{-5}$/°C.

(2) Preparation of a hub

The pellets prepared in (1) were injection-molded at a resin temperature of 300° C. to obtain hubs to which a stainless steel (SUS304) disk having a diameter of 22 mm and a thickness of 0.5 μmm was inserted. The hubs had a projection for ultrasonic bonding and had a diameter of 25 mm and a thickness of 2.5 mm.

(3) Crack resistance test

The hubs formed above were subjected to a heat cycle test (consisting of 15 cycles, each cycle being carried out by keeping the hub at 50° C. for 2 hours, cooling it for 2 hours, keeping it at −10° C. and elevating the temperature thereof for 2 hours), and the appearance of the hub was examined. Table 1 shows the result.

(4) Bonding test

The hub was ultrasonically bonded to an optical disk substrate formed of a hydrogenation product of a ring-opening polymerization polymer of 6-methyl-1,4:5,8-dimethano-1,4,4a,5,6,7,8,8a-octahydronaphthalene and having a diameter of 130 mm and a thickness of 1.2 mm. The optical disk substrate was fixed and a peel test was carried out by applying a tensile load of 10 kg to the hub. Table 1 shows the result.

EXAMPLE 2

Example 1 was repeated except that 30 parts of the glass fiber of which the surface had been treated with γ-aminopropyltrimethoxysilane was replaced with 20 parts of a carbon fiber (average diameter 7 μm, average length 5 mm), whereby hubs were obtained. The hubs were subjected to the crack resistance test and the bonding test. Table 1 shows the results.

The resin composition used above had a mold shrinkage factor of 0.35% and a linear expansion coefficient of $3.5 \times 10^{-5}$/°C.

EXAMPLE 3

Example 1 was repeated except that 10 parts of a talc powder (average particle diameter 2 μm) of which the surface had been treated with γ-aminopropyltrimethoxysilane was further incorporated when pellets were prepared and that the resin temperature was adjusted to 280° C. when hubs were formed, whereby hubs were obtained. The hubs were subjected to the crack resistance test and the bonding test. Table 1 shows the results.

The resin composition used above had a mold shrinkage factor of 0.19% and a linear expansion coefficient of $1.9 \times 10^{-5}$/°C.

EXAMPLE 4

Example 1 was repeated except for the following. The hydrogenation product of a ring-opening polymerization polymer of 6-methyl-1,4:5,8-dimethano-1,4,4a,5,6,7,8,8a-octahydronaphthalene was replaced with a hydrogenation product of a ring-opening polymerization copolymer of 6-methyl-1,4:5,8-dimethano-1,4,4a,5,6,7,8,8a-octahydronaphthalene and norbornene (molar ratio 80:20). (The hydrogenation product used in this Example had an intrinsic viscosity, measured in decalin at 80° C., of 1.32 dl/g and a hydrogenation ratio of nearly 100%). Further, 10 parts of a talc powder (average particle diameter 2 μm) of which the surface had been treated with γ-aminopropyltrimethoxysilane was additionally incorporated, and the resin temperature was adjusted to 270° C. when hubs were formed. The hubs obtained were subjected to the crack resistance test and the bonding test. Table 1 shows the results.

The resin composition used above had a mold shrinkage factor of 0.26% and a linear expansion coefficient of $2.4 \times 10^{-5}$/°C.

EXAMPLE 5

25 Parts of a glass fiber (average diameter 13 μm, average length 6 mm) of which the surface had been treated with γ-aminopropyltrimethoxysilane, 15 parts of a talc powder (average particle diameter 2 μm) of which the surface had been treated with γ-aminopropyltrimethoxysilane and 0.05 part of tetrakis[3-(3,5-di-tert-butyl-hydroxyphenyl)propionyloxymethyl]methan were incorporated into 100 parts of a hydrogenation product of a ring-opening polymerization polymer of 6-ethyl-1,4:5,8-dimethano-1,4,4a,5,6,7,8,8a-octahydronaphthalene (hydrogenation product having an intrinsic viscosity, measured in decalin at 80° C., of 1.05 dl/g and a hydrogenation ratio of nearly 100%), and the resultant composition was treated in the same manner as in Example 1 to give pellets. The pellets were treated in the same manner as in Example 1 except that the resin temperature was adjusted to 280° C., whereby hubs were formed. The hubs were subjected to the crack resistance test and the bonding test. Table 1 shows the results.

The resin composition used above had a mold shrinkage factor of 0.25% and a linear expansion coefficient of $2.6 \times 10^{-5}$/°C.

EXAMPLE 6

Example 1 was repeated except for the following. The hydrogenation product of a ring-opening polymerization polymer of 6-methyl-1,4:5,8-dimethano-1,4,4a,5,6,7,8,8a-octahydronaphthalene was replaced with a hydrogenation product of a ring-opening polymerization copolymer of 6-methyl-1,4:5,8-dimethano-1,4,4a,5,6,7,8,8a-octahydronaphthalene and 5-methyl-5-methoxycarbonyl-2-norbornene (molar ratio 95:5). The hydrogenation product used in this Example had an intrinsic viscosity, measured in chlorobenzene at 80° C., of 1.04 dl/g and a hydrogenation ratio of nearly 100%. Further, 10 parts of a talc powder (average particle diameter 2 μm) of which the surface had been treated with γ-aminopropyltrimethoxysilane was additionally incorporated, and the resin temperature was adjusted to 270° C. when hubs were formed. The resultant hubs were subjected to the crack resistance test and the bonding test. Table 1 shows the results.

The resin composition used above had a mold shrinkage factor of 0.21% and a linear expansion coefficient of $2.0 \times 10^{-5}$/°C.

EXAMPLE 7

Example 1 was repeated except for the following. The hydrogenation product of a ring-opening polymerization polymer of 6-methyl-1,4:5,8-dimethano-1,4,4a,5,6,7,8,8a-octahydronaphthalene was replaced with a hydrogenation product of a ring-opening polymerization copolymer of 6-methyl-1,4:5,8-dimethano-1,4,4a,5,6,7,8,8a-octahydronaphthalene and dicyclopentadiene (molar ratio 10:90). The hydrogenation product used in this Example had an intrinsic viscosity, measured in decalin at 80° C., of 1.72 dl/g and a hydrogenation ratio of nearly 100%. Further, 10 parts of a talc powder (average particle diameter 2 μm) of which the surface had been treated with γ-aminopropyltrimethoxysilane was additionally incorporated, and the resin temperature was adjusted to 270° C. when hubs were formed. The resultant hubs were subjected to the crack resistance test and the bonding test. Table 1 shows the results.

The resin composition used above had a mold shrinkage factor of 0.22% and a linear expansion coefficient of $2.0 \times 10^{-5}$/°C.

EXAMPLE 8

Example 1 was repeated except that 10 parts of a calcium carbonate powder (average particle diameter 3 μm) was further incorporated and that the resin temperature was adjusted to 280° C. when hubs were formed. The resultant hubs were subjected to the crack resistance test and the bonding test. Table 1 shows the results.

The resin composition used above had a mold shrinkage factor of 0.23% and a linear expansion coefficient of $2.1 \times 10^{-5}$/°C.

EXAMPLE 9

Example 1 was repeated except for the following. The hydrogenation product of a ring-opening polymerization polymer of 6-methyl-1,4:5,8-dimethano-1,4,4a,5,6,7,8,8a-octahydronaphthalene was replaced with a hydrogenation product of a ring-opening polymerization copolymer of 6-methyl-1,4:5,8-dimethano-1,4,4a,5,6,7,8,8a-octahydronaphthalene and norbornene (molar ratio 80:20). The hydrogenation product used in this Example had an intrinsic viscosity, measured in decalin at 80° C., of 1.32 dl/g and a hydrogenation ratio of nearly 100%. Further, 10 parts of an aluminum hydroxide powder (average particle diameter 4 μm) of which the surface had been treated with α-aminopropyltrimethoxysilane was additionally incorporated, and the resin temperature was adjusted to 270° C. when hubs were formed. The resultant hubs were subjected to the crack resistance test and the bonding test. Table 1 shows the results.

The resin composition used above had a mold shrinkage factor of 0.22% and a linear expansion coefficient of $2.1 \times 10^{-5}$/°C.

EXAMPLE 10

Example 1 was repeated except for the following. 100 Parts of the hydrogenation product of a ring-opening polymerization polymer of 6-methyl-1,4:5,8-dimethano-1,4,4a,5,6,7,8,8a-octahydronaphthalene was replaced with a mixture of 50 parts of a hydrogenation product of a ring-opening polymerization copolymer of 6-methyl-1,4:5,8-dimethano-1,4,4a,5,6,7,8,8a-octahydronaphthalene and ethylene (molar ratio 40:60) with 50 parts of a hydrogenation product of a ring-opening polymerization copolymer of 6-methyl-1,4:5,8-dimethano-1,4,4a,5,6,7,8,8a-octahydronaphthalene and norbornene (molar ratio 80:20). The former hydrogenation product used in this Example had an intrinsic viscosity, measured in decalin at 80° C., of 0.62 dl/g, and the latter hydrogenation product used in this Example had an intrinsic viscosity, measured in decalin at 80° C., of 1.32 dl/g and a hydrogenation ratio of nearly 100%. Further, 10 parts of a talc powder (average particle diameter 2 μm) of which the surface had been treated with γ-aminopropyltrimethoxysilane was additionally incorporated, and the resin temperature was adjusted to 270° C. when hubs were formed. The resultant hubs were subjected to the crack resistance test and the bonding test. Table 1 shows the results.

The resin composition used above had a mold shrinkage factor of 0.23% and a linear expansion coefficient of $2.2 \times 10^{-5}$/°C.

COMPARATIVE EXAMPLE 1

Example 1 was repeated except that the glass fiber of which the surface had been treated with the γ-aminopropyltrimethoxysilane was not incorporated. The resultant hubs were subjected to the crack resistance test and the bonding test. Table 1 shows the results.

The resin composition used above had a mold shrinkage factor of 0.85% and a linear expansion coefficient of $7.5 \times 10^{-5}$/°C.

COMPARATIVE EXAMPLE 2

Example 1 was repeated except for the following. The hydrogenation product of a ring-opening polymerization polymer of 6-methyl-1,4:5,8-dimethano-1,4,4a,5,6,7,8,8a-octahydronaphthalene was replaced with a hydrogenation product of a ring-opening polymerization copolymer of 6-methyl-1,4:5,8-dimethano-1,4,4a,5,6,7,8,8a-octahydronaphthahlene and norbornene (molar ratio 80:20). The hydrogenation product used in this Example had an intrinsic viscosity, measured in decalin at 80° C., of 1.32 dl/g and a hydrogenation ratio of nearly 100%. Further, the resin temperature was adjusted to 270° C. when hubs were formed. The resultant hubs were subjected to the crack resistance test and the bonding test. Table 1 shows the results.

The resin composition used above had a mold shrinkage factor of 0.91% and a linear expansion coefficient of $7.3 \times 10^{-5}$/°C.

TABLE 1

| | Occurrence of crack after heat cycle test | Bonding state of hub when load was applied |
|---|---|---|
| Example 1 | not cracked | not peeled |
| Example 2 | not cracked | not peeled |
| Example 3 | not cracked | not peeled |
| Example 4 | not cracked | not peeled |
| Example 5 | not cracked | not peeled |
| Example 6 | not cracked | not peeled |
| Example 7 | not cracked | not peeled |
| Example 8 | not cracked | not peeled |
| Example 9 | not cracked | not peeled |
| Example 10 | not cracked | not peeled |
| Comparative Example 1 | cracked | not peeled |
| Comparative Example 2 | cracked | not peeled |

The thermoplastic saturated norbornene-based polymer composition used in the present invention has a low linear expansion coefficient, and the difference in the linear expansion coefficient between the thermoplastic saturated norbornene-based polymer composition and an insertion part is hence small. Therefore, molded articles of the present invention are excellent in mechanical strength and heat resistance.

Molded articles of the present invention are also excellent in water resistance, electrical insulating properties, chemical resistance, etc., due to the use of a thermoplastic saturated norbornene-based polymer. Further, articles of the present invention are also excellent in dimensional stability due to the incorporation of a filler, and well bonded to a molded article of a thermoplastic saturated norbornene-based polymer.

What is claimed is:

1. A molded article integrally formed by molding a thermoplastic saturated norbornene-based polymer composition comprising (a) 100 parts by weight of a thermoplastic saturated norbornene-based polymer having an intrinsic viscosity of 0.3 to 3.0 dl/g when measured in decalin or chlorobenzene at 80° C. and (b) 10 to 100 parts by weight of a filler in the presence of an insertion member having a linear expansion coefficient of not more than $2.5 \times 10^{-5}/°C$.

2. A molded article according to claim 1, wherein the thermoplastic saturated norbornene-based polymer is a saturated polymer prepared by hydrogenation of a ring-opening polymerization polymer of at least one member of monomers of the formula I,

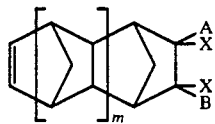

wherein each of A and B is hydrogen or a hydrocarbon having 1 to 10 carbon atoms, each of X and Y is hydrogen, a hydrocarbon having 1 to 10 carbon atoms, halogen, a halogen-substituted hydrocarbon having 1 to 10 carbon atoms, $-(CH_2)_nCOOR^1$, $-(CH_2)_nOCOR^1$, $-(CH_2)_nCN$, $-(CH_2)_nCONR^1R^2$, $-(CH_2)_nCOOZ$, $-(CH_2)_nOCOZ$, $-(CH_2)_nOZ$, or $-(CH_2)_nW$ or X and Y together constitute $-CO-O-CO-$ or $-CO-NR^3-CO-$ or alternatively, a combination of A with X or a combination of B with Y constitutes alkylidene, and m is 0 or 1, in which each of $R^1$, $R^2$ and $R^3$ is a hydrocarbon having 1 to 20 carbon atoms, Z is a hydrocarbon having 1 to 20 carbon atoms or a halogen-substituted hydrocarbon having 1 to 20 carbon atoms, W is $-Si(R^4)_3$ in which each or $R^4$'s is independently a hydrocarbon having 1 to 10 carbon atoms, and n is an integer of 0 to 10.

3. A molded article according to claim 1, wherein the thermoplastic saturated norbornene-based polymer is an addition type copolymer of at least one member of monomers of the formula I.

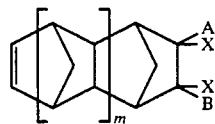

wherein each of A and B is hydrogen or a hydrocarbon having 1 to 10 carbon atoms, each of X and Y is hydrogen, a hydrocarbon having 1 to 10 carbon atoms, halogen, a halogen-substituted hydrocarbon having 1 to 10 carbon atoms, $-(CH_2)_nCOOR^1$, $-(CH_2)_nOCOR^1$, $-(CH_2)_nCN$, $-(CH_2)_nCONR^1R^2$, $-(CH_2)_nCOOZ$, $-(CH_2)_nOCOZ$, $-(CH_2)_nOZ$, or $-(CH_2)_nW$ or X and Y together constitute $-CO-O-O-$ or $-CO-NR^3-CO$, or alternatively, a combination of A with X or a combination of B with Y constitutes alkylidene, and m is 0 or 1, in which each of $R^1$, $R^2$ and $R^3$ is a hydrocarbon having 1 to 20 carbon atoms, Z is a hydrocarbon having 1 to 20 carbon atoms or a halogen-substituted hydrocarbon having 1 to 20 carbon atoms, W is $-Si(R^4)_3$ in which each of $R^4$'s is independently a hydrocarbon having 1 to 10 carbon atoms, and n is an integer of 0 to 10, with ethylene and/or an α-olefin, or a hydrogenation product thereof.

4. A molded article according to claim 1, wherein the filler is a fibrous filler.

5. A molded article according to claim 1, wherein the filler comprises 1 to 99 parts by weight of a fibrous filler and 99 to 1 parts by weight of a powdery filler.

6. A molded article according to claim 1 wherein the insertion member having a linear expansion coefficient of not more than $2.5 \times 10^{-5}/°C$. is metal, glass or ceramics 7. A molded article integrally formed by molding a polymer comprising (a) 100 parts by weight of a thermoplastic saturated norbornene-based polymer having an intrinsic viscosity of 0.3 to 3.0 dl/g when measured in decalin or chlorobenzene at 80° C. and (b) 10 to 100 parts by weight of a filler in the presence of an insertion member formed of a stainless steel.

8. A molded article according to claim 7, wherein the thermoplastic saturated norbornene-based polymer is a saturated polymer prepared by hydrogenation of a ring-opening polymerization polymer of at least one member of monomers of the formula I,

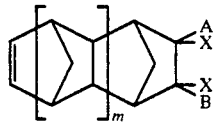

wherein each of A and B is hydrogen or a hydrocarbon having 1 to 10 carbon atoms, each of X and Y is hydrogen, a hydrocarbon having 1 to 10 carbon atoms, halogen, a halogen-substituted hydrocarbon having 1 to 10 carbon atoms, $-(CH_2)_nCOOR^1$, $-(CH_2)_nOCOR^1$, $-(CH_2)_nCN$, $-(CH_2)_nCONR^1R^2$, $-(CH_2)_nCOOZ$, $-(CH_2)_nOCOZ$, $-(CH_2)_nOZ$, or $-(CH_2)_nW$ or X and Y together constitute $-CO-O-CO-$ or $-CO-NR^3-CO-$ or alternatively, a combination of A with X or a combination of B with Y constitutes alkylidene, and m is 0 or 1, in which each of $R^1$, $R^2$ and $R^3$ is hydrocarbon having 1 to 20 carbon atoms, Z is a hydrocarbon having 1 to 20 carbon atoms or a halogen-substituted hydrocarbon having 1 to 20 carbon atoms, W is $-Si(R^4)_3$ in which each of $R^4$'s is independently a hydrocarbon having 1 to 10 carbon atoms, and n is an integer of 0 to 10.

9. A molded article according to claim 7, wherein the thermoplastic saturated norbornene-based polymer is an addition type copolymer of at least one member of monomers of the formula I,

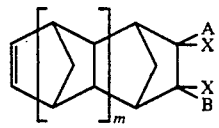

wherein each of A and B is hydrogen or a hydrocarbon having 1 to 10 carbon atoms, each of X and Y is hydrogen, a hydrocarbon having 1 to 10 carbon atoms, halogen, a halogen-substituted hydrocarbon having 1 to 10 carbon atoms, $-(CH_2)_nCOOR^1$, $-(CH_2)_nOCOR^1$, $-(CH_2)_nCN$, $-(CH_2)_nCONR^1R^2$ $-(CH_2)_nCOOZ$, $-(CH_2)_nOCOZ$, $-(CH_2)_nOZ$, or $-(CH_2)_nW$ or X and Y together constitute $-CO-O-CO-$ or $-CO-NR^3-CO-$, or alternatively, a combination of A with X or a combination of B with Y constitutes alkylidene, and m is 0 or 1, in which each of $R^1$, $R^2$ and $R^3$ is a hydrocarbon having 1 to 20 carbon atoms, Z is a hydrocarbon having 1 to 20 carbon atoms or a halogen-substituted hydrocarbon having 1 to 20 carbon atoms, W is $-Si(R^4)_3$ in which each of $R^4$'s is independently a hydrocarbon having 1 to 10 carbon atoms, and n is an integer of 0 to 10, with ethylene and/or an α-olefin, or a hydrogenation product thereof.

10. A molded article according to claim 7, which is a hub for an optical disk.

11. An optical disk comprising the hub of claim 10 and an optical disk substrate onto which said hub is bonded; said optical disk substrate being made of a thermoplastic saturated norbornene-based polymer.

12. The optical disk of claim 11 wherein said hub is bonded ultrasonically onto said optical disk substrate.

13. A process for producing an optical disk by bonding the hub of claim 10 onto an optical disk substrate of a thermoplastic saturated norbornene-based polymer.

14. The process of claim 13 wherein said hub is bonded ultrasonically onto said optical disk substrate.

15. The molded article of claim 1, wherein said filler is an inorganic filler.

16. The molded article of claim 1, wherein said molded article has a coefficient of linear expansion of not more than $5.0 \times 10^{-5}$/°C.

* * * * *